United States Patent
Uesugi

(10) Patent No.: US 11,894,710 B2
(45) Date of Patent: Feb. 6, 2024

(54) BATTERY PACK, CHARGING SYSTEM, AND METHOD FOR CONTROLLING CHARGING OF BATTERY PACK

(71) Applicant: MAKITA CORPORATION, Anjo (JP)

(72) Inventor: Hiroki Uesugi, Anjo (JP)

(73) Assignee: MAKITA CORPORATION, Anjo (JP)

(*) Notice: Subject to any disclaimer, the term of this patent is extended or adjusted under 35 U.S.C. 154(b) by 480 days.

(21) Appl. No.: 17/011,347

(22) Filed: Sep. 3, 2020

(65) Prior Publication Data

US 2021/0075243 A1 Mar. 11, 2021

(30) Foreign Application Priority Data

Sep. 6, 2019 (JP) ................................. 2019-163120

(51) Int. Cl.
*H02J 7/00* (2006.01)
*H01M 10/48* (2006.01)
*H01M 10/44* (2006.01)

(52) U.S. Cl.
CPC ......... *H02J 7/00718* (2020.01); *H01M 10/44* (2013.01); *H01M 10/48* (2013.01); *H02J 7/007182* (2020.01)

(58) Field of Classification Search
CPC ............. H02J 7/007182; H02J 7/00714; H02J 7/00712; H01M 2010/4271; H01M 2010/4278; H01M 10/425
See application file for complete search history.

(56) References Cited

U.S. PATENT DOCUMENTS

| | | | |
|---|---|---|---|
| 2003/0219267 A1* | 11/2003 | Shim ................. | G03G 15/0266 399/176 |
| 2006/0076921 A1 | 4/2006 | Kubota et al. | |
| 2012/0091966 A1* | 4/2012 | Mori .................... | H01M 10/44 320/160 |
| 2013/0320923 A1* | 12/2013 | Hooker ................ | B60L 53/305 320/109 |
| 2015/0256016 A1* | 9/2015 | Wang ................... | H01M 10/44 320/162 |
| 2018/0003773 A1* | 1/2018 | Umemura ........... | H02J 7/00047 |
| 2019/0222041 A1* | 7/2019 | Liu ..................... | H02J 7/00308 |

FOREIGN PATENT DOCUMENTS

| | | | |
|---|---|---|---|
| CN | 107834946 B | * 10/2021 | .............. H02P 23/28 |
| JP | 3972930 B2 | 9/2007 | |
| JP | 2019106816 A | * 6/2019 | ......... H01L 21/0242 |

* cited by examiner

*Primary Examiner* — Edward Tso
*Assistant Examiner* — Ahmed H Omar
(74) *Attorney, Agent, or Firm* — Oliff PLC

(57) ABSTRACT

A battery pack in one aspect of the present disclosure includes a first cell, a memory device, a target current calculator, and an information notifier. The memory device stores a maximum variation of a charging current value. The maximum variation is determined depending on a characteristic of the battery pack. The target current calculator calculates a newest value of a target current value based on (i) a previous value of the target current value and (ii) the maximum variation. The information notifier transmits a charge condition information including the newest value.

16 Claims, 7 Drawing Sheets

BATTERY PACK, CHARGING SYSTEM, AND METHOD FOR CONTROLLING CHARGING OF BATTERY PACK

CROSS-REFERENCE TO RELATED APPLICATIONS

This application claims the benefit of Japanese Patent Application No. 2019-163120 filed on Sep. 6, 2019 with the Japan Patent Office, the disclosure of which is incorporated herein by reference.

BACKGROUND

The present disclosure relates to charging of a battery pack.

Japanese Patent No. 3972930 discloses a charging system including a battery pack and a charger. The battery pack includes a battery to be charged with a charging current supplied from the charger. The charger performs a control process. In the control process, the charger increases the charging current by a fixed magnitude (e.g., by a predetermined maximum variation) with lapse of a time period, to thereby bring the value of the charging current up to a target current value.

SUMMARY

Some charging systems may include a charging stop function in order to inhibit damage to a battery pack. The charging stop function stops a charging operation when a voltage of a battery pack (hereinafter also referred to as a battery voltage) exceeds a predetermined permissible upper limit.

Some chargers may be configured to be connected not only to a single type of battery pack but also to multiple types of battery packs. Such chargers can charge the multiple types of battery packs, and thus can be used in various situations.

However, the case where the charger is configured to be connected to multiple types of battery packs may cause a situation where rise in the battery voltage caused by increase in a charging current supplied from the charger is too large for the battery pack to which the charger is connected. In such a situation, the battery voltage may exceed the permissible upper limit of the battery pack to thereby activate the charging stop function.

Battery packs may differ, depending on their types, in characteristics of each battery pack therein (e.g., an internal resistance of a cell, a charge capacity of the cell, and so on). If the internal resistance of the cell is large, rise in the battery voltage with respect to a unit variation of the charging current (e.g., a maximum variation of the charging current) becomes large. Thus, in the battery pack with the cell having a large internal resistance, the charging stop function may be activated before the battery pack is sufficiently charged, whereby charging may be stopped. Such an event is also referred to as, for example, early stop of charging.

To cope with this, setting a smaller maximum variation may be able to inhibit activation of the charging stop function described above. However, in that case, since an increase rate of the charging current is smaller, it takes longer for the charging current to reach a target value, and thus, a charging time for the battery pack to be sufficiently charged may become longer.

In one aspect of the present disclosure, it is desirable to be able to inhibit activation of the charging stop function caused by rise in the battery voltage with increase in the charging current, and further to reduce the charging time.

A battery pack in one aspect of the present disclosure includes a first cell, a memory device, a target current calculator, and/or an information notifier.

The first cell is charged with a charging current supplied from a charger. The memory device stores a maximum variation of a charging current value. The charging current value corresponds to a magnitude of the charging current. The maximum variation is determined depending on a characteristic of the battery pack.

The target current calculator calculates a newest value of a target current value based on (i) a previous value of the target current value and (ii) the maximum variation. The target current value corresponds to the magnitude of the charging current required to charge the first cell. In other words, the target current value corresponds to a target value of the charging current value. The information notifier transmits, to the charger, charge condition information including the newest value. The previous value may correspond to any value calculated earlier than the newest value, or may correspond to a value calculated immediately before the newest value.

As described above, the maximum variation corresponds to the characteristic of the battery pack, and thus, the target current value may be increased or decreased according to the characteristic of the battery pack. The battery pack notifies the charger of such a target current value.

This makes it possible to inhibit an excessive increase of the charging current. As a result, a variation of a charging voltage caused by the change in the charging current can fall within a range according to the characteristic of the battery pack. The charging voltage is a voltage that the charger applies to the battery pack.

Accordingly, this battery pack can inhibit an excessive variation of the charging voltage, thus inhibiting early stop of charging and damage to the first cell. The early stop of charging refers to, for example, stop of a charging operation caused by extraordinary increase in the charging voltage before completion of charging of the first cell. The damage to the first cell refers to, for example, damage to the first cell caused by an impermissible charging voltage.

The characteristic of the battery pack may include at least a magnitude of an impedance of the first cell.

The variation of the charging voltage caused by the change in the charging current varies according to, for example, the characteristic of the battery pack (e.g., the magnitude of the impedance of the first cell). Thus, use of the maximum variation makes it possible to set the variation of the charging voltage to a value suited to the characteristic of the battery pack. Accordingly, since the variation of the charging voltage is limited according to the characteristic of the battery pack, this battery pack can inhibit the excessive variation of the charging voltage.

The battery pack may include a second cell. The second cell may be charged with the charging current. The first cell may be connected in series to the second cell, or may be connected in parallel with the second cell. The characteristic of the battery pack may depend on at least an arrangement (or configuration) of the first cell and the second cell.

The characteristic of the battery pack may be generally determined according to the configuration of the battery, such as the series-connected configuration of the first cell and the second cell, the parallel-connected configuration of the first cell and the second cell, or the number of branches for the cells. In the case where the battery pack includes the first cell and the second cell connected in parallel with each other, the variation of the charging voltage caused by the change in the charging current may vary according to the total number of the cells, the number of the branches, and/or the number of the cells included in each branch. Such a characteristic of the battery pack makes it possible to set the variation of the charging voltage suited to the battery pack including the first cell and the second cell connected in parallel with each other.

Next, the above-described battery pack may further include an operation information acquirer. The operation information acquirer may acquire charging operation information from the charger. The charging operation information may relate to an operation required for the charger to charge the first cell. The charging operation information may include the charging current value. The target current calculator may set the charging current value included in the charging operation information as the previous value in order to calculate the newest value.

Since the charging operation information is acquired from the charger, this battery pack can accurately get the magnitude of the charging current that the charger is outputting to the battery pack. Since the newest value is calculated based on (i) the maximum variation and (ii) the charging current value included in the charging operation information, this battery pack can calculate the newest value properly even when an error is caused between the previous value and the charging current value.

Accordingly, this battery pack can inhibit calculation of an improper newest value, thus inhibiting the excessive variation of the charging voltage.

Next, the above-described battery pack may further include a voltage comparator. The voltage comparator may determine whether a cell voltage value is smaller than a target voltage value. The cell voltage value may correspond to a magnitude of a voltage of the first cell. The target voltage value may correspond to the magnitude of the voltage of the first cell required for the charger to charge the first cell. The target current calculator may calculate the newest value by adding the maximum variation to the previous value, in response to the voltage comparator determining that the cell voltage value is smaller than the target voltage value.

Such a configuration enables this battery pack to calculate the newest value so as to increase the charging current value while maintaining the cell voltage value of the first cell within tolerance. Accordingly, this battery pack can increase the charging current value within tolerance, thus reducing a charging time from initiation to completion of the charging.

The target current calculator may calculate the newest value by subtracting the maximum variation from the previous value, in response to the voltage comparator determining that the cell voltage value is larger than or equal to the target voltage value.

Such a configuration enables this battery pack to calculate the newest value while inhibiting the cell voltage value of the first cell beyond tolerance, by reducing the target current value when the cell voltage value is larger than or equal to the target voltage value. Accordingly, this battery pack enables continued proper charging operation while inhibiting occurrence of charging stop caused by an impermissible cell voltage value.

The above-described battery pack may further include a charging current comparator. The charging current comparator may determine whether a provisional current value is smaller than or equal to a reference current value. The provisional current value may correspond to a sum of the previous value and the maximum variation. The reference current value may correspond to an upper limit of the charging current value permissible in the first cell at charging.

The target current calculator may calculate the newest value by adding the maximum variation to the previous value, in response to the charging current comparator determining that the provisional current value is smaller than or equal to the reference current value. The target current calculator may set the reference current value as the newest value, in response to the charging current comparator determining that the provisional current value is larger than the reference current value.

Such a configuration enables this battery pack to calculate the newest value so as to increase the charging current value of the first cell while maintaining the charging current value within tolerance. Accordingly, this battery pack can increase the charging current value within tolerance, thus reducing the charging time from initiation to completion of the charging.

Furthermore, this battery pack can calculate the newest value while inhibiting the magnitude of the charging current beyond tolerance. Accordingly, this battery pack enables continued proper charging operation while inhibiting occurrence of charging stop caused by an impermissible charging current.

A charging system in another aspect of the present disclosure may include the above-mentioned battery pack and a charger.

The charger may include a current outputter, a condition information acquirer, and/or an output current setter. The current outputter may supply the charging current to the battery pack. The condition information acquirer may acquire the charge condition information from the battery pack. The output current setter may set the magnitude of the charging current based on the newest value included in the charge condition information.

In this charging system, the charger is notified of the charge condition information from the battery pack, and the charger supplies the battery pack with the charging current of the magnitude set based on the newest value included in the charge condition information. Similarly to the above-described battery pack, this charging system can inhibit the excessive variation of the charging voltage, thus inhibiting the early stop of charging and damage to the first cell.

The charger may further include an output current comparator. The output current comparator may determine whether the newest value is smaller than or equal to an upper limit current value. The upper limit current value may correspond to an upper limit of the charging current value determined according to a temperature of the charger.

The output current setter may set the newest value as a value corresponding to the magnitude of the charging current, in response to the output current comparator determining that the newest value is smaller than or equal to the upper limit current value. The output current setter may set the upper limit current value as a value corresponding to the magnitude of the charging current, in response to the output current comparator determining that the newest value is larger than the upper limit current value.

Such a configuration enables this charging system to inhibit damage to the charger caused by an excessive temperature rise during charging of the battery pack by the charger.

Another aspect of the present disclosure includes a method for controlling charging of a battery pack, the method including:

calculating a newest value of a target current value based on (i) a previous value of the target current value and (ii) a maximum variation, the target current value corresponding to a magnitude of a charging current required to charge a cell of the battery pack, the maximum variation being determined depending on a characteristic of the battery pack; and notifying a charger of charge condition information including the newest value.

This method exerts effects similar to those of the above-described battery pack.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

The present disclosure is not limited to example embodiments below, and can take various forms within the technical scope of the present disclosure.

1. First Embodiment 1-1. Overall Configuration

A configuration of a charging system 1 according to the present embodiment will be described with reference to FIG. 1.

Figure 1:
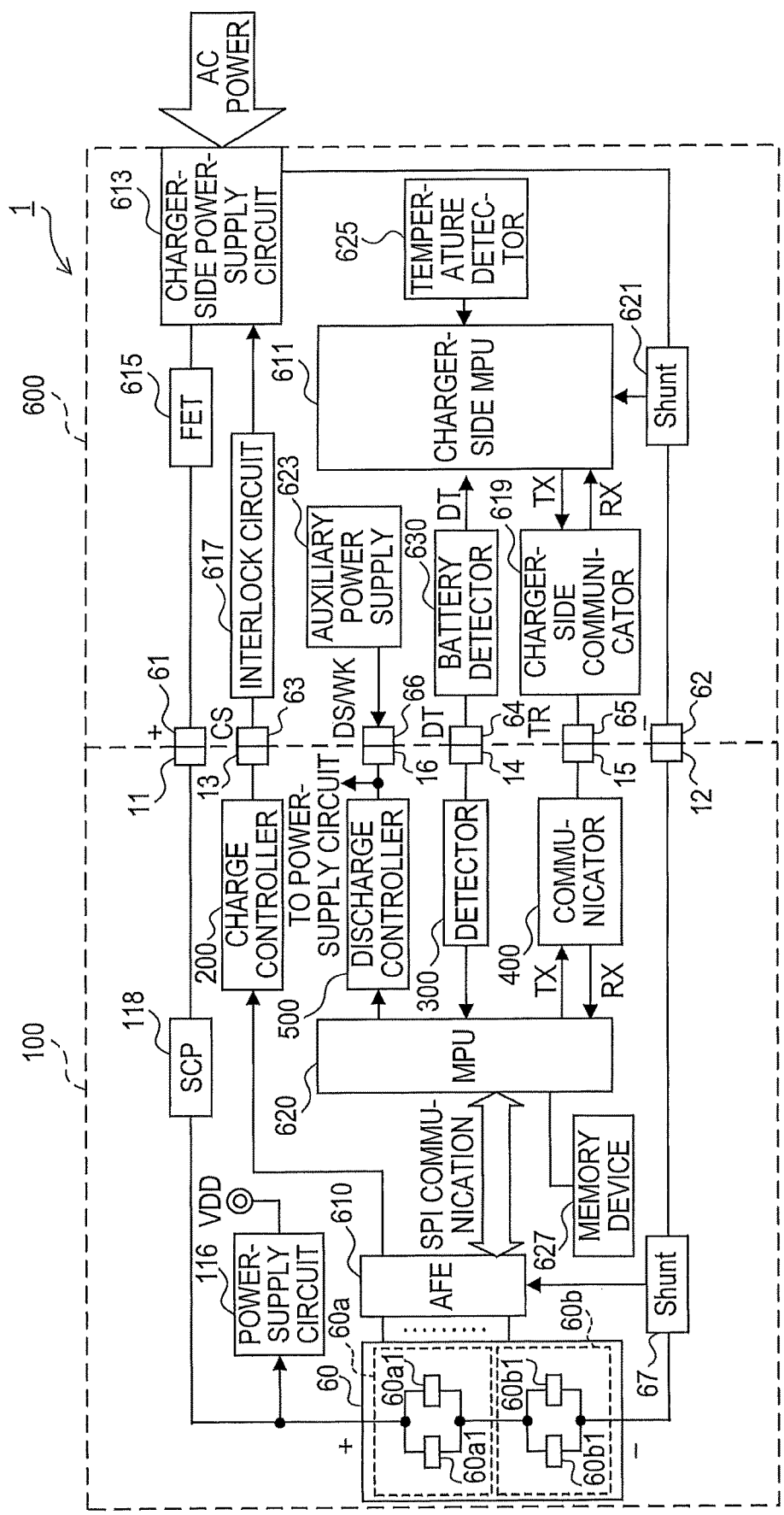
FIG. 1 is a block diagram showing an overview of a battery pack and a charger.

As shown in FIG. 1, the charging system 1 includes a battery pack 100 and a charger 600.

The battery pack 100 is configured to be connected to the charger 600.

The charger 600 supplies electric power to the battery pack 100. The battery pack 100 is also configured to be connected to an external device (not shown) to supply electric power to the external device. Examples of the external device may include an electric working machine and a lighting device. The electric working machine and the lighting device operate with the electric power from the battery pack 100. Examples of the electric working machine may include a power tool, such as a hammer drill, a chainsaw, and a grinder, and a working machine for gardening, such as a grass cutter, a hedge trimmer, and a lawn trimmer.

The battery pack 100 includes a battery 60, an Analog Front End (AFE) 610, a Micro Processing Unit (MPU) 620, a power-supply circuit 116, and a Self Control Protector (SCP) 118.

The battery pack 100 further includes a positive terminal 11, a negative terminal 12, a CS terminal 13, a DT terminal 14, a TR terminal 15, a DS terminal 16, a charge controller 200, a detector 300, a communicator 400, a discharge controller 500, and a memory device 627.

The battery 60 includes a first cell 60a and a second cell 60b. The cell 60a and the second cell 60b in the present embodiment are connected in series to each other. The first cell 60a includes electric power storages (or partial cells) 60a1 connected in parallel with each other. That is, the first cell 60a includes branches each having the corresponding electric power storage 60a1. The electric power storage 60a1 is configured to be charged with the charging current. The second cell 60b includes electric power storages (or partial cells) 60b1. The electric power storage 60b1 is configured to be charged with the charging current. In other embodiments, the first cell 60a may include the electric power storages 60a1 connected in series to each other, or may include the electric power storages 60a1 connected in series to each other and the electric power storages 60a1 connected in parallel with each other. The first cell 60a and the second cell 60b are rechargeable batteries, and each may be, for example, a lithium ion battery or the like. A rated voltage of the battery 60 in the present embodiment is, for example, 18 V. The rated voltage of the battery 60 is not limited to 18 V, and may be 36 V, 72 V, or other voltage. The first cell 60a and the second cell 60b are charged with a charging current supplied from the charger 600. A voltage output from the battery 60 is referred to as a battery voltage.

The MPU 620 includes a microcomputer with a CPU, a ROM, a RAM, and I/Os, and performs various controls including charge/discharge control of the battery 60. The MPU 620 further includes interrupt ports PT (not shown) that receive various signals input thereto. When (i) the detector 300 detects a connected state, where the battery pack 100 is connected to the charger 600, and (ii) a specified condition is satisfied, the MPU 620 transitions from a normal operation mode (or a control operation state) to a sleep mode (or a low-power operation state). In the sleep mode, part of the operation of the MPU 620 is stopped to reduce power consumption. Then, when any one of the interrupt ports PT receives a signal during the sleep mode, the MPU 620 wakes up and transitions to the normal operation mode. For example, the MPU 620 wakes up when (i) the detector 300 detects the connected state and (ii) the interrupt port PT receives a connection detection information Sa1. The MPU 620 transitions to the sleep mode when (i) the detector 300 does not detect the connected state (i.e., the charger 600 is detached) and (ii) a specified condition is satisfied.

In other words, the MPU 620 is configured to switch to any of operation modes (operation states) including the normal operation mode and the sleep mode. The MPU 620 in the control operation state controls charge and discharge of the battery 60. The MPU 620 in the low-power operation state does not perform control of charge and discharge of the battery 60. The low-power operation state consumes lower power in comparison to the control operation state.

The AFE 610 is an analog circuit mounted on a circuit board, and detects the voltage of each of the first cell 60a and the second cell 60b (hereinafter also referred to as a cell voltage) in accordance with a command from the MPU 620. The AFE 610 also detects a temperature of the first cell 60a (hereinafter also referred to as a cell temperature) via a first thermistor (not shown) included in the battery 60. The AFE 610 performs a cell balancing process for equalizing remaining energies of the first cell 60a and the second cell 60b. The AFE 610 detects a board temperature via a second thermistor (not shown) provided on the circuit board. The AFE 610 detects, via a shunt resistor 67, a charging current flowing into the battery 60 (specifically, the first cell 60a and the second cell 60b) and a discharge current flowing out of the battery 60 (specifically, the first cell 60a and the second cell 60b). The AFE 610 converts values of the detected cell voltages, the detected cell temperature, the detected board temperature, the detected charging current, and the detected discharge current into respective digital signals, and outputs the resulting digital signals to the MPU 620.

Further, the AFE 610 determines whether to permit or prohibit charging of the first cell 60a based on the detected state of the first cell 60a, generates a charging permission signal or a charging prohibition signal, and outputs the generated signal to the charge controller 200.

The power-supply circuit 116 includes a regulator. When the battery pack 100 (specifically, the MPU 620) is in a shutdown state (hereinafter also referred to as an inactive state), the regulator receives electric power from an auxiliary power supply 623 in the charger 600 via the DS terminal 16, and generates a power-supply voltage VDD. The power-supply voltage VDD is used to operate internal circuits of the battery pack 100. The charger 600 includes a charger-side DS terminal 66 to be connected to the DS terminal 16. The charger-side DS terminal 66 is connected to the auxiliary power supply 623.

The battery pack 100 transitions to the shutdown state when the first cell 60a or the second cell 60b enters an over-discharge state. Upon being supplied with the power-supply voltage VDD, the MPU 620 returns from the shutdown state to a non-shutdown state (hereinafter also referred to as an active state). If the first cell 60a and the second cell 60b are in a chargeable state, the MPU 620 outputs a charging permission signal to the charger 600. When the magnitude of the battery voltage reaches a specified voltage value, the power-supply circuit 116 is supplied with electric power from the battery 60. The power-supply circuit 116 generates the power-supply voltage VDD by receiving the electric power from the battery 60.

The SCP 118 is provided on a positive-side connection line of the battery pack 100. The positive-side connection line of the battery pack 100 connects a positive electrode of the battery 60 to the positive terminal 11. The SCP 118 includes a fuse. The SCP 118 includes an internal circuit to blow the fuse in accordance with a command from the MPU 620. Upon the fuse being blown, the positive-side connection line breaks, and charge and discharge of the battery 60 via the positive terminal 11 cannot be performed. That is, the battery 60 is unable to be reused.

The MPU 620 commands the SCP 118 to blow the fuse as a last resort in order to ensure safety, in a case where (i) charging is not stopped in spite of a charging prohibition signal being output from the battery pack 100 to the charger 600 or (ii) discharge is not stopped in spite of a discharge prohibition signal being output from the battery pack 100 to the external device. That is, the SCP 118 is a circuit for ensuring double safety against an overcharge state and an over-discharge state of the first cell 60a and/or the second cell 60b. The SCP 118 may regularly diagnose whether the internal circuit therein operates normally and output the diagnosis result to the MPU 620. If the SCP 118 has no self-diagnosis function, the MPU 620 may perform an SCP diagnosis process to thereby determine whether the SCP 118 operates properly.

The MPU 620 determines, based on the various signals input thereto, a state of the first cell 60a and/or the second cell 60b. Then, the MPU 620 determines whether to permit or prohibit charging of the first cell 60a and the second cell 60b based on the determined state of the first cell 60a and/or the second cell 60b, and generates a charging permission signal or a charging prohibition signal. The MPU 620 outputs the charging permission signal or the charging prohibition signal to the charge controller 200 via the AFE 610. Similarly, the MPU 620 determines whether to permit or prohibit discharge from the first cell 60a and/or the second cell 60b based on the determined state of the first cell 60a and/or the second cell 60b, generates a discharge permission signal or a discharge prohibition signal, and outputs the generated signal to the discharge controller 500. To improve responsiveness to the external device (specifically, the electric working machine), the MPU 620 may generate a discharge permission signal continuously during the sleep mode and output the discharge permission signal to the discharge controller 500.

When the battery pack 100 is connected to the external device, the positive terminal 11 and the negative terminal 12 are respectively connected to a device-side positive terminal and a device-side negative terminal of the external device. When the battery pack 100 is connected to the charger 600, the positive terminal 11 and the negative terminal 12 are respectively connected to a charger-side positive terminal 61 and a charger-side negative terminal 62 of the charger 600. This enables power supply from the battery pack 100 to the external device and power supply from the charger 600 to the battery pack 100.

The CS terminal 13 is connected to the charge controller 200. When the battery pack 100 is connected to the charger 600, the CS terminal 13 outputs a charging permission signal or a charging prohibition signal to the charger 600. The charge controller 200 outputs the charging permission signal through the CS terminal 13 when the charge controller 200 receives the charging permission signal from the AFE 610. The charge controller 200 outputs the charging prohibition signal through the CS terminal 13 when the charge controller 200 receives the charging prohibition signal from the AFE 610.

The memory device 627 is configured to store a maximum variation $\Delta Ibat$ used in a target current calculation process to be described later. The memory device 627 includes a storage (e.g., a memory), and the MPU 620 can read out various information (e.g., the maximum variation $\Delta Ibat$) stored in the storage. The maximum variation $\Delta Ibat$ corresponds to a maximum variation of the charging current during the charge control. In other words, the maximum variation $\Delta Ibat$ is a maximum variation of a charging current value corresponding to the magnitude of the charging current.

The maximum variation $\Delta Ibat$ corresponds to a characteristic of the battery pack 100. In the present embodiment, the maximum variation $\Delta Ibat$ corresponds to a characteristic of the first cell 60a. The characteristic(s) of the battery pack 100 corresponds/correspond to an impedance Z of the first cell 60a and/or the arrangement of the first cell 60a and the second cell 60b. In other words, the characteristic(s) of the battery pack 100 is/are determined according to the total number of the cells, the series-connected configuration of the cells, the parallel-connected configuration of the cells, the number of the branches for the cells connected in parallel, and/or the like. In the battery pack 100, the maximum variation ΔIbat corresponding to such a characteristic of the battery pack 100 is stored in the memory device 627. Specifically, the maximum variation ΔIbat is set such that a voltage variation ΔViz calculated by multiplying the maximum variation ΔIbat by the impedance Z is smaller than a difference value ΔVa between a charge completion voltage value Vcut and a target voltage value CV (ΔVa=Vcut−CV).

The charger 600 includes a charger-side CS terminal 63 to be connected to the CS terminal 13. The charger 600 includes an interlock circuit 617 connected to the charger-side CS terminal 63. The charger 600 includes a charger-side power-supply circuit 613 configured to supply a DC power. The interlock circuit 617 permits a power supply operation by the charger-side power-supply circuit 613 during receipt of the charging permission signal from the battery pack 100. The interlock circuit 617 prohibits the power supply operation by the charger-side power-supply circuit 613 during receipt of the charging prohibition signal from the battery pack 100. The charger-side power-supply circuit 613 is configured to convert an AC power from a commercial power supply (e.g., AC 100 V) into the DC power with an AC/DC converter or the like to supply the DC power.

The DT terminal 14 is connected to a charger-side communication terminal 64 of the charger 600 when the battery pack 100 is connected to the charger 600. The charger-side communication terminal 64 is connected to a battery detector 630. The DT terminal 14 has an electric potential VDT. The electric potential VDT varies depending on whether the charger 600 is connected to the battery pack 100. The electric potential VDT also varies depending on whether the battery pack 100 is in the inactive state or in the active state.

The battery detector 630 determines whether the electric potential VDT indicates the inactive state or the active state of the battery pack 100. Based on the determination result, the battery detector 630 detects whether the battery pack 100 is in the inactive state. Upon detection that the battery pack 100 is in the active state, the battery detector 630 turns ON a discharge switch 615. The discharge switch 615 is provided on a positive-side connection line of the charger 600. The positive-side connection line of the charger 600 is a power line provided between the charger-side positive terminal 61 and the charger-side power-supply circuit 613. The discharge switch 615 may include, for example, a Field Effect Transistor (FET).

This allows power supply from the charger 600 to the battery pack 100 to thereby charge the battery 60 (specifically, the first cell 60a and the second cell 60b). Upon detection that the battery pack 100 is in the inactive state, the battery detector 630 turns OFF the discharge switch 615.

The DT terminal 14 is connected to the detector 300 of the battery pack 100. The detector 300 detects the electric potential VDT, and determines whether the electric potential VDT indicates that the charger 600 is unconnected to (or disconnected from) the battery pack 100. The detector 300 detects, based on the electric potential VDT, whether the charger 600 is connected to the battery pack 100. The detector 300 outputs the detection result to the MPU 620 through the interrupt port(s) PT. The detector 300 may output the detection result to the AFE 610. Further, the detector 300 may output the detection result to the MPU 620 and the AFE 610.

The MPU 620 acquires, based on the detection result input thereto, charger information including unconnection information, OFF information, and ON information. The charger information (i.e., the unconnection information, the OFF information, and the ON information) is transmitted from the charger 600 to the battery pack 100, and is received by the battery pack 100.

The unconnection information indicates that the charger 600 is unconnected to the battery pack 100. The OFF information indicates that the charger 600 is connected to the battery pack 100 and that the discharge switch 615 is OFF. The ON information indicates that the charger 600 is connected to the battery pack 100 and that the discharge switch 615 is ON.

The TR terminal 15 is a terminal for serial communication, and is connected to the communicator 400. The communicator 400 includes a Universal Asynchronous Receiver/Transmitter (UART) circuit configured to perform a half-duplex communication.

The charger 600 includes a charger-side TR terminal 65 to be connected to the TR terminal 15, and a charger-side communicator 619 connected to the charger-side TR terminal 65. The charger-side communicator 619 includes a Universal Asynchronous Receiver/Transmitter (UART) circuit configured to perform a half-duplex communication.

The charger 600 includes a charger-side MPU 611. The charger-side MPU 611 includes a microcomputer with a CPU, a ROM, a RAM, and I/Os, and performs various controls including charge control of the charger 600. The charger-side MPU 611 detects, via a shunt resistor 621, the magnitude of a discharge current flowing out of the charger-side power-supply circuit 613. If the charger-side MPU 611 detects an anormal magnitude of the discharge current, the charger-side MPU 611 stops charging of the battery 60 (specifically, the first cell 60a and the second cell 60b) with such anormal discharge current by, for example, turning OFF the discharge switch 615.

When a specified condition is satisfied after charging of the battery pack 100 is complete, the charger-side MPU 611 transitions from a normal operation mode (or a control operation state) to a sleep mode (or a low-power operation state). In the sleep mode, part of the operation of the charger-side MPU 611 is stopped to reduce power consumption. Before transitioning from the normal operation mode to the sleep mode, the charger-side MPU 611 transmits a sleep transition signal Sa2 to the MPU 620 via the charger-side communicator 619. The sleep transition signal Sa2 is a parameter signal indicating that the charger-side MPU 611 of the charger 600 has transitioned to the sleep mode.

The MPU 611 includes interrupt ports PT (not shown) that receive various signals input thereto. When any one of the interrupt ports PT receives a signal during the sleep mode, the charger-side MPU 611 wakes up and transitions to the normal operation mode. For example, the charger-side MPU 611 wakes up when (i) the charger-side MPU 611 detects a connected state, where the charger 600 is connected to the battery pack 100, and (ii) the interrupt port PT receives a connection detection information Sb1. The charger-side MPU 611 transitions to the sleep mode when (i) the charger-side MPU 611 does not detect the connected state (i.e., the battery pack 100 is detached) and (ii) a specified condition is satisfied.

The MPU 620 performs a serial communication with the charger-side MPU 611 via the communicator 400, the TR terminal 15, the charger-side TR terminal 65, and the charger-side communicator 619. The MPU 620 and the charger-side MPU 611 communicate with each other in a specified communication cycle Tc (e.g., Tc=8 [sec]) as long as communication therebetween is established. The MPU 620, the communicator 400, and the TR terminal 15 perform a two-way communication with the charger 600.

The DS terminal 16 is connected to the discharge controller 500. When the battery pack 100 is connected to the external device (specifically, the electric working machine), the DS terminal 16 outputs a discharge permission signal or a discharge prohibition signal to the external device. The discharge controller 500 outputs the discharge permission signal or the discharge prohibition signal through the DS terminal 16 based on the discharge permission signal or the discharge prohibition signal input from the MPU 620. When the battery pack 100 in the inactive state is connected to the charger 600, the electric power from the auxiliary power supply 623 is input to the DS terminal 16 via the charger-side DS terminal 66.

The charger 600 includes a temperature detector 625 configured to detect a temperature of the charger 600. The temperature detector 625 transmits the detected temperature (hereinafter also referred to as a detector temperature T1) to the charger-side MPU 611. The charger-side MPU 611 stores the detector temperature T1 in a storage, such as the RAM in the charger-side MPU 611. The temperature detector 625 may include a thermistor (not shown) provided adjacent to, for example, any of the charger-side power-supply circuit 613, the discharge switch 615, the shunt resistor 621, and so on.

1-2. Charge Condition Setting Process and Charge Control Process

An explanation will be given of various processes performed in the charger 600 and the battery pack 100 during charging of the battery pack 100. Specifically, a charge control process performed by the charger-side MPU 611 of the charger 600 and a charge condition setting process performed by the MPU 620 of the battery pack 100 will be described with reference to flowcharts of FIGS. 2 and 3, respectively. In the present embodiment, whether the charging is completed is determined based on the first cell 60a. In another embodiment, whether the charging is completed may be determined based on the second cell 60b. In yet another embodiment, whether the charging is completed may be determined based on both the first cell 60a and the second cell 60b, and the charging of the battery pack 100 may be completed by completion of the charging of the first cell 60a and/or the second cell 60b.

The charger-side MPU 611 wakes up when (i) the charger-side MPU 611 detects the connected state and (ii) the charger-side MPU 611 receives the connection detection information Sb1 through the interrupt port PT, and then, the charger-side MPU 611 initiates the charge control process. The MPU 620 wakes up when (i) the detector 300 detects the connected state and (ii) the interrupt port PT receives the connection detection information Sa1, and then, the MPU 620 initiates an operation in the normal operation mode (i.e., the control operation state), and initiates the charge condition setting process.

The charge control process by the charger-side MPU 611 and the charge condition setting process by the MPU 620 are initiated simultaneously, and then performed concurrently.

Upon initiating the charge control process, the charger-side MPU 611 firstly performs an initial communication process in S110 (S represents a step: the same applies hereinafter). Upon initiating the charge condition setting process, the MPU 620 performs an initial communication process in S310. The initial communication processes include confirming that signals can be mutually transmitted and received between the battery pack 100 and the charger 600 (i.e., between the MPU 620 and the charger-side MPU 611).

Upon completing the initial communication process properly, the charger-side MPU 611 proceeds to S120, and sets an output current value Inow to 0 ampere ([A]). The output current value Inow is one of internal variables used in the charge control process performed by the charger-side MPU 611. The output current value Inow is an internal variable for storing a current value of the discharge current output by the charger-side power-supply circuit 613. The discharge current output by the charger-side power-supply circuit 613 also corresponds to a charging current for charging the battery pack 100.

In subsequent S130, the charger-side MPU 611 transmits the output current value Inow to the MPU 620. In detail, the charger-side MPU 611 transmits a numerical value set as the output current value Inow to the MPU 620.

Upon completing the initial communication process properly, the MPU 620 receives, in S320, the output current value Inow from the charger-side MPU 611. In this step, the MPU 620 waits until it receives the output current value Inow. In other words, the MPU 620 performing the process in S320 acquires, from the charger 600, the output current value Inow included in charging operation information. The charging operation information indicates the charging operation by the charger 600. The output current value Inow is information of the charging current output to the battery pack 100 by the charger 600. In detail, the MPU 620 acquires the output current value Inow from the charger-side MPU 611 via the communicator 400 and the charger-side communicator 619.

In subsequent S140, the charger-side MPU 611 acquires a charger temperature T1 from the temperature detector 625. The charger-side MPU 611 stores the detector temperature T1 as one of the internal variables used in the charge control process, in the storage in the charger-side MPU 611.

In subsequent S150, the charger-side MPU 611 determines an upper limit current value Ic1 based on the detector temperature T1. The upper limit current value Ic1 corresponds to a permissible upper limit of the magnitude of the charging current to be output by the charger 600. The upper limit current value Ic1 is one of the internal variables used in the charge control process performed by the charger-side MPU 611. The charger-side MPU 611 calculates the upper limit current value Ic1 corresponding to the charger temperature T1 using a calculation formula, mapping information, or the like generated based on a correlation between the charger temperature T1 and the upper limit current value Ic1, and sets the calculation result as the upper limit current value Ic1. The higher the charger temperature T1 of the charger 600 is, the smaller the upper limit current value Ic1 set by the charger-side MPU 611 is.

In S330, the MPU 620 acquires a cell voltage value Vnow and a battery temperature Tb. The MPU 620 acquires a value of the cell voltage of the first cell 60a from the AFE 610 and stores it, as the cell voltage value Vnow, in the storage in the MPU 620. The MPU 620 acquires the cell temperature of the first cell 60a from the AFE 610 and stores it, as the battery temperature Tb, in the storage in the MPU 620.

In subsequent S340, the MPU 620 sets a reference current value Iset, a target voltage value CV, and a charge completion current value Icut. These are the internal variables used in the charge control process performed by the charger-side MPU 611.

The reference current value Iset corresponds to an upper limit of the magnitude of the charging current permissible in the first cell 60a during charging by the charger 600. The MPU 620 calculates the reference current value Iset corresponding to the battery temperature Tb acquired in S330 using a calculation formula, mapping information, or the like generated based on a correlation of the reference current value Iset with the battery temperature Tb, and sets the calculation result as the reference current value Iset.

The target voltage value CV is a target value of the cell voltage in the first cell 60a during charging by the charger 600. That is, the target voltage value CV corresponds to the magnitude of the cell voltage required for the charger 600 to charge the first cell 60a. The MPU 620 calculates the target voltage value CV corresponding to the battery temperature Tb acquired in S330 using a calculation formula, mapping information, or the like generated based on a correlation of the target voltage value CV with the battery temperature Tb, and sets the calculation result as the target voltage value CV.

The charge completion current value Icut is a threshold value for determining completion of charging of the first cell 60a. More specifically, the charge completion current value Icut corresponds to the magnitude of the charging current supplied from the charger 600 when the first cell 60a is in a charge completion state. The MPU 620 calculates the charge completion current value Icut corresponding to the battery temperature Tb acquired in S330 using a calculation formula, mapping information, or the like generated based on a correlation of the charge completion current value Icut with the battery temperature Tb, and sets the calculation result as the charge completion current value Icut.

In subsequent S350, the MPU 620 determines whether the cell voltage value Vnow is larger than or equal to the target voltage value CV. Upon affirmative determination, the MPU 620 proceeds to S390; whereas upon negative determination, the MPU 620 proceeds to S360. In other words, the MPU 620 performing the process in S350 compares the cell voltage value Vnow with the target voltage value CV, and determines whether the cell voltage value Vnow is smaller than the target voltage value CV.

Upon proceeding to S360 after the negative determination in S350, the MPU 620 determines whether the sum of the output current value Inow and the maximum variation ΔIbat (=Inow+ΔIbat: hereinafter also referred to as a provisional current value Ite) is larger than the reference current value Iset. Upon affirmative determination, the MPU 620 proceeds to S380; whereas upon negative determination, the MPU 620 proceeds to S370. In S360, the MPU 620 calculates the provisional current value Ite using the maximum variation ΔIbat read out from the memory device 627. In other words, the MPU 620 performing the process in S360 compares the provisional current value Ite with the reference current value Iset, and determines whether the provisional current value Ite is smaller than or equal to the reference current value Iset.

Upon proceeding to S370 after the negative determination in S360, the MPU 620 sets the sum of the output current value Inow and the maximum variation ΔIbat (i.e., the provisional current value Ite) as a target current value Inext. The target current value Inext corresponds to the magnitude of the charging current required to charge the first cell 60a. In other words, the target current value Inext is a target value for the charging current value to be reached. Specifically, the MPU 620 performing the process in S370 calculates a newest value of the target current value Inext (hereinafter also referred to as a newest value Ine2) obtained by adding the maximum variation ΔIbat to the output current value Inow.

In S370, the newest value Ine2 may be calculated using a previous value of the target current value Inext (hereinafter also referred to as a previous value Ine1) calculated last time, instead of using the output current value Inow. In other words, the MPU 620 may calculate the newest value Ine2 based on the previous value Ine1 and the maximum variation ΔIbat. The MPU 620 performs the process in S370 repeatedly in the charge condition setting process, to thereby repeatedly calculate the target current value Inext.

Upon proceeding to S380 after the affirmative determination in S360, the MPU 620 sets the reference current value Iset as the target current value Inext.

Upon proceeding to S390 after the affirmative determination in S350, the MPU 620 determines whether the cell voltage value Vnow is larger than or equal to the charge completion voltage value Vcut. Upon affirmative determination, the MPU 620 proceeds to S430; whereas upon negative determination, the MPU 620 proceeds to S400. The charge completion voltage value Vcut is a determination value for determining completion of charging of the first cell 60a, and corresponds to the voltage of the first cell 60a when the first cell 60a is in the charge completion state.

Upon proceeding to S400 after the negative determination in S390, the MPU 620 calculates the target current value Inext by subtracting the maximum variation ΔIbat from the output current value Inow. In the present embodiment, the subtraction is performed using the maximum variation ΔIbat; however the subtraction may be performed using another numerical value (e.g., a current decrease reference amount ΔIbat2), instead of using the maximum variation ΔIbat, to thereby set the target current value Inext. Specifically, the target current value Inext may be set using different numerical values depending on whether the target current value Inext is to be increased or decreased.

In subsequent S410, the MPU 620 determines whether the target current value Inext is smaller than the charge completion current value Icut. Upon affirmative determination, the MPU 620 proceeds to S430; whereas upon negative determination, the MPU 620 proceeds to S420.

In S420, the MPU 620 transmits the target current value Inext to the charger-side MPU 611. Specifically, the MPU 620 transmits the target current value Inext set in any of S370, S380, and S400 to the charger-side MPU 611. The MPU 620 transmits the target current value Inext to the charger-side MPU 611 via the communicator 400 and the charger-side communicator 619. In this way, the charger 600 is notified of the target current value Inext by the battery pack 100.

In S160, the charger-side MPU 611 receives the target current value Inext from the MPU 620. In this step, the charger-side MPU 611 waits until it receives the target current value Inext. Specifically, in S160, the charger-side MPU 611 acquires, from the battery pack 100, the target current value Inext included in charge condition information.

In subsequent S170, the charger-side MPU 611 determines whether the target current value Inext is larger than the upper limit current value Ic1. Upon affirmative determination, the charger-side MPU 611 proceeds to S190; whereas upon negative determination, the charger-side MPU 611 proceeds to S180. In other words, in S170, the charger-side MPU 611 determines whether the newest value Ine2 is smaller than or equal to the upper limit current value Ic1.

Upon proceeding to S180 after the negative determination in S170, the charger-side MPU 611 sets the target current value Inext as an output current value Iout. Upon proceeding to S190, the charger-side MPU 611 sets the upper limit current value Id1 as the output current Iout. The charger-side MPU 611 controls a current output by the charger-side power-supply circuit 613 based on the setting of the output current Iout. That is, in the charger 600, the output current according to the output current Iout is output from the charger-side power-supply circuit 613.

In other words, in S180 and S190, the charger-side MPU 611 sets the magnitude of the charging current to be output from the charger-side power-supply circuit 613. Especially in S180, the charger-side MPU 611 sets the magnitude of the charging current to be output from the charger-side power-supply circuit 613 based on the target current value Inext.

In subsequent S200, the charger-side MPU 611 sets the output current Iout as the output current value Inow.

After performing the process in S200, the charger-side MPU 611 proceeds to S130 again, whereafter the charger-side MPU 611 performs the processes in S130 to S200.

In S430, the MPU 620 determines that charging of the first cell 60a is complete, and transmits a charge completion signal Ss for notifying of completion of charging to the charger-side MPU 611. After performing the process in S430, the MPU 620 terminates the charge condition setting process. The charger-side MPU 611 terminates the charge control process upon receiving the charge completion signal Ss.

As described so far, the battery pack 100 performs the charge condition setting process and the charger 600 performs the charge control process, whereby the battery pack 100 transmits the target current value Inext to the charger 600 (S420) and the charger 600 outputs the output current Iout set based on the target current value Inext to the battery pack 100 (S180).

Moreover, the battery pack 100 sets the target current value Inext using the maximum variation ΔIbat set according to the characteristic(s) of the battery pack 100 (S370, S400). This enables the target current value Inext to be changed according to the characteristic(s) of the battery pack 100.

Furthermore, the battery pack 100 sets the reference current value Iset as the target current value Inext if the provisional current value Ite is larger than the reference current value Iset. This inhibits the target current value Inext from excessively increasing.

1-3. Comparison Between the Present Embodiment and Comparative Example 1 in Terms of Earlier Stop of Charging Here, an explanation will be given of the ability of the charging system 1 of the present embodiment to inhibit early stop of charging, by comparing the present embodiment with Comparative Example 1.

As described above, the present embodiment is directed to the charging system 1 configured to perform charging of a battery pack using the maximum variation ΔIbat stored in the battery pack 100. On the other hand, Comparative Example 1 is directed to a charging system (not shown) configured to perform charging of a battery pack using a maximum variation stored in a charger.

Figure 4:
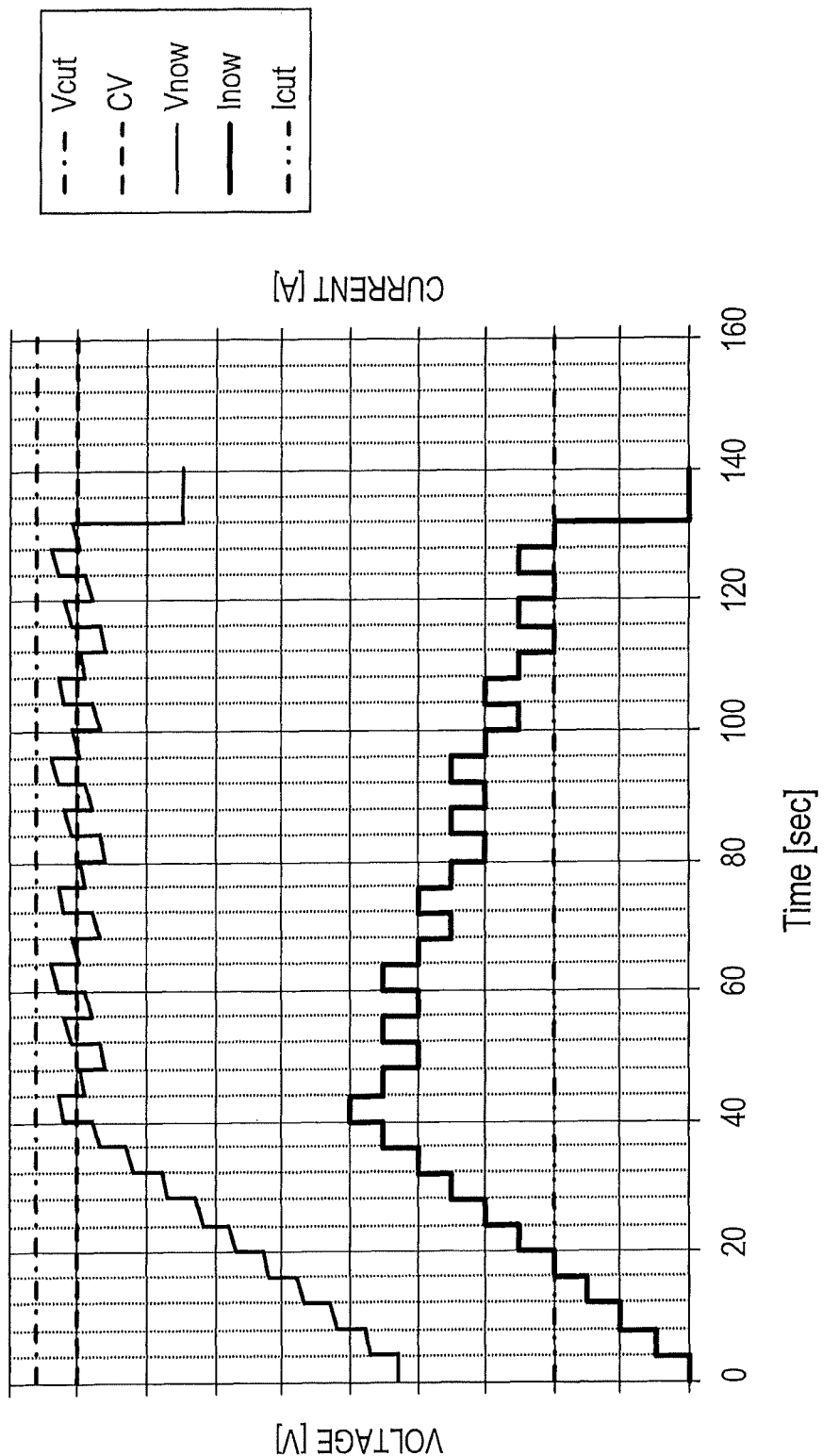
FIG. 4 is a time chart showing profiles of a cell voltage value Vnow and an output current value Inow in an embodiment.

FIG. 4 shows profiles of the cell voltage value Vnow and the output current value Inow when the battery pack 100 performs the charge condition setting process and the charger 600 performs the charge control process in the present embodiment.

Specifically, in the present embodiment, upon initiation of charging at time 0 [sec], the output current value Inow is repeatedly increased stepwise by the maximum variation ΔIbat, and this results in the cell voltage value Vnow also being repeatedly increased stepwise. Then, upon the cell voltage value Vnow exceeding the target voltage value CV (at around time 40 [sec]), the output current value Inow is decreased stepwise by the maximum variation ΔIbat (at around time 44 [sec]).

Here, if the cell voltage value Vnow exceeds not only the target voltage value CV but also the charge completion voltage value Vcut, the charger determines that the charging is complete, thus stopping the charging. However, in the present embodiment, the maximum variation ΔIbat stored in the battery pack 100 is set according to the characteristic(s) of the battery pack 100. Thus, the cell voltage value Vnow is inhibited from exceeding the charge completion voltage value Vcut even after the output current value Inow is repeatedly increased stepwise by the maximum variation ΔIbat.

Subsequently, when the cell voltage value Vnow falls below the target voltage value CV with the decrease in the output current value Inow, the output current value Inow is increased stepwise by the maximum variation ΔIbat (at around time 52 [sec]). Then, when the cell voltage value Vnow exceeds the target voltage value CV, the output current value Inow is decreased stepwise by the maximum variation ΔIbat.

That is, after the cell voltage value Vnow reaches the target voltage value CV, the output current value Inow is controlled to be increased or decreased by the maximum variation ΔIbat so that the cell voltage value Vnow remains close to the target voltage value CV.

Subsequently, while the cell voltage value Vnow remains close to the target voltage value CV, the output current value Inow is gradually decreased (over a period approximately from time 52 to time 132 [sec]) with the increase in charged power energy of the first cell 60a. Then, when the output current value Inow falls below the charge completion current value Icut, the charger determines that the charging is complete, thus terminating the charging (at time 132 [sec]).

Figure 5:
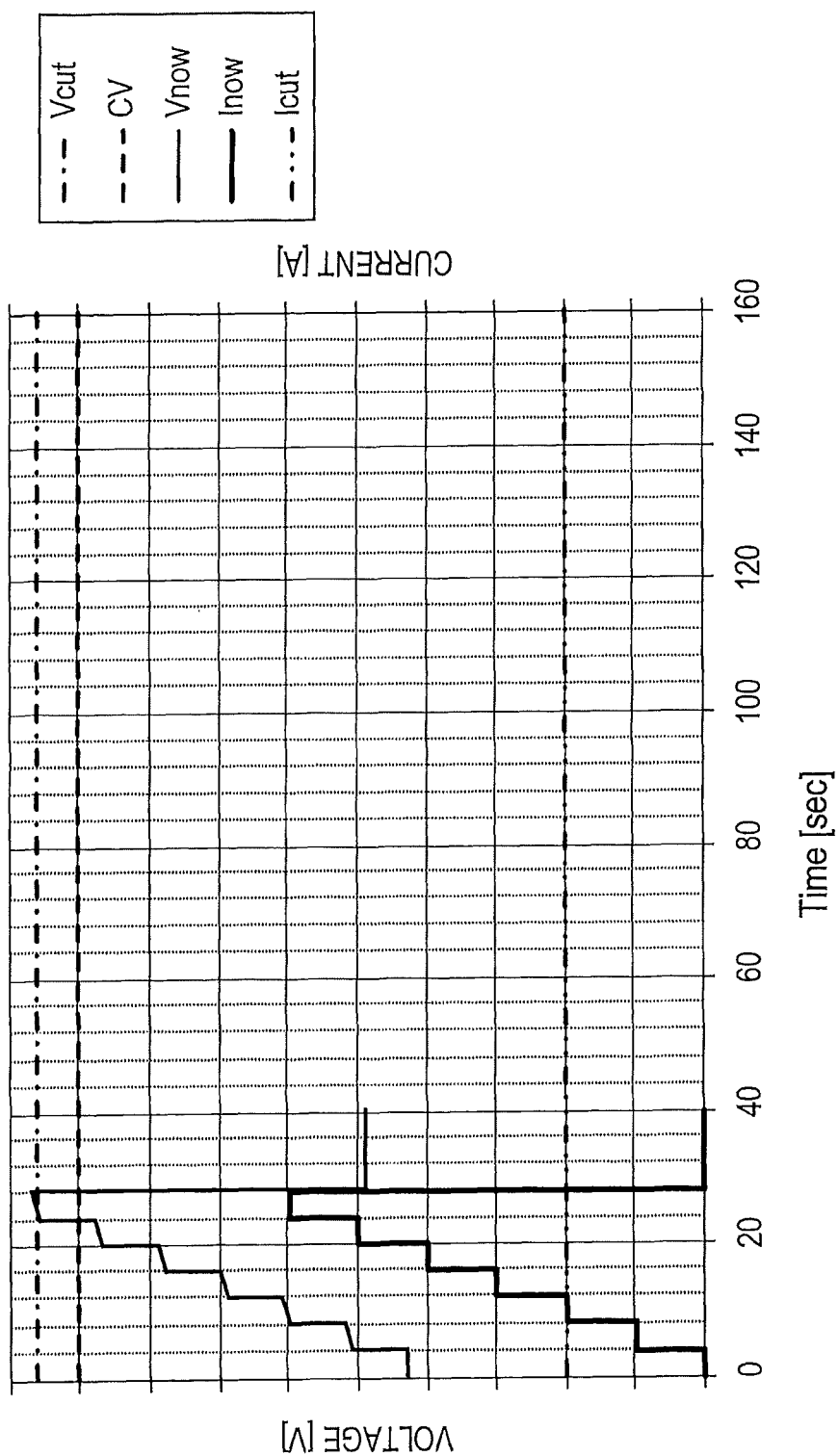
FIG. 5 is a time chart showing profiles of a cell voltage value Vnow and an output current value Inow in Comparative Example 1.

FIG. 5 shows profiles of the cell voltage value Vnow and the output current value Inow when a charge control is performed by a battery pack and the charger of Comparative Example 1.

Figure 2:
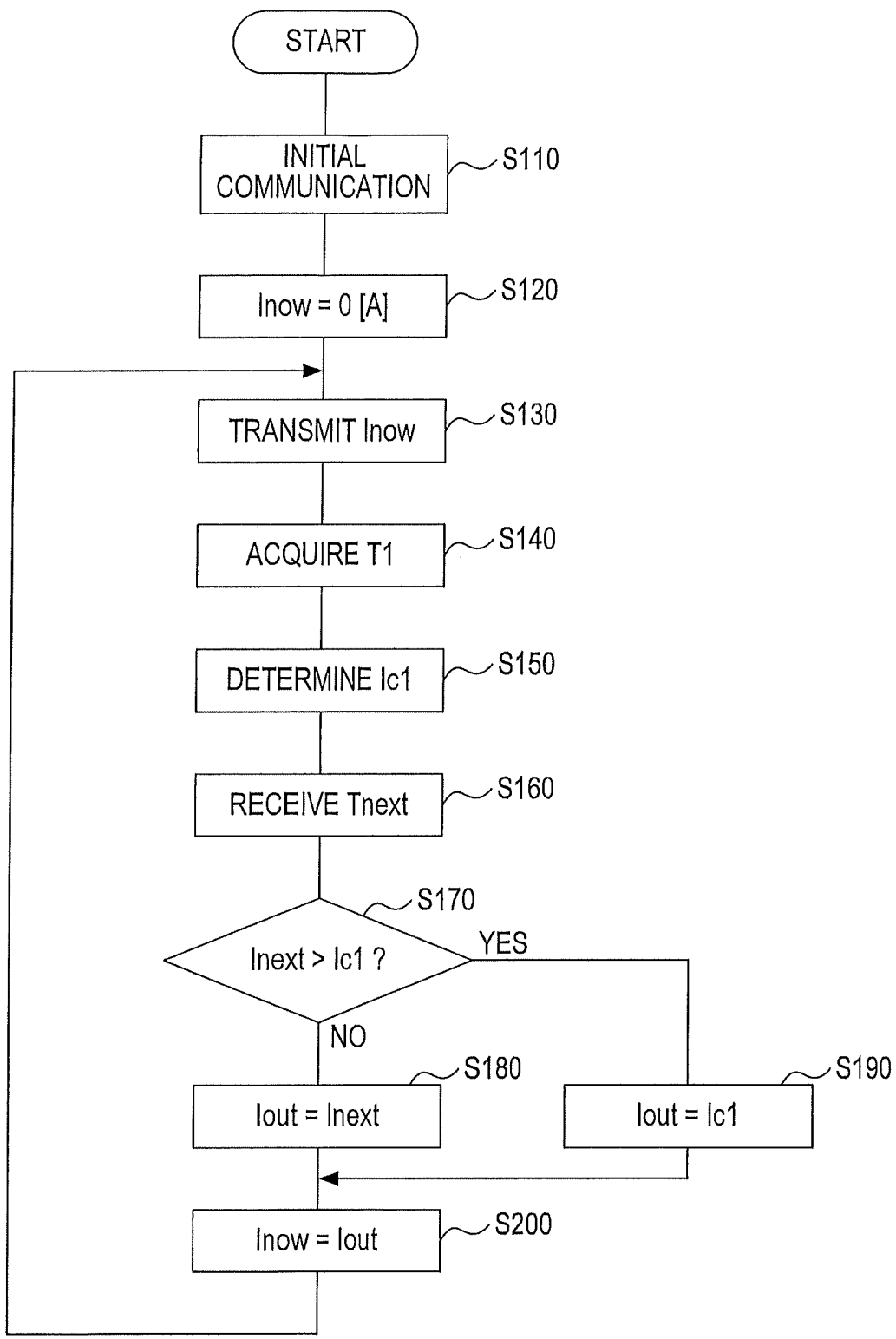
FIG. 2 is a flowchart showing a flow of a charge control process performed by a charger-side MPU of the charger.

The charge control process performed by the charger of Comparative Example 1 is different from the charge control process of the present embodiment shown in FIG. 2 in that the process of receiving the target current value Inext from the battery pack 100 is not included. The charge control process of Comparative Example 1 is different from the charge control process of the present embodiment in that the output current Iout is set as the target current value Inext using a maximum variation ΔI2 stored in the charger. A larger value is set as the maximum variation ΔI2 in Comparative Example 1 than the maximum variation ΔIbat in the present embodiment.

In Comparative Example 1, upon initiation of charging at time 0 [sec], the output current value Inow is repeatedly increased stepwise by the maximum variation ΔI2 stored in the charger, and this results in the cell voltage value Vnow also being repeatedly increased stepwise. Here, since a larger value is set as the maximum variation ΔI2 than the maximum variation ΔIbat, voltage rise in Comparative Example 1 is larger than that in the present embodiment. Thus, the cell voltage value Vnow exceeds not only the target voltage value CV but also the charge completion voltage value Vcut by a single update of the output current value Inow by the maximum variation ΔI2 (at around time 24 [sec]).

As described above, when the cell voltage value Vnow exceeds the charge completion voltage value Vcut, the charger determines that the charging is complete, thus stopping the charging (see S390 and S430). That is, in Comparative Example 1, early stop of charging occurs in which, although the battery is in a state not sufficiently charged, the charger erroneously determines that the charging is complete, thus stopping the charging.

This occurs when the maximum variation $\Delta I2$ stored in the charger is not suited to a characteristic of the battery pack.

As seen from the above, as compared with Comparative Example 1, the present embodiment can inhibit occurrence of the early stop of charging, to thereby charge the battery pack 100 sufficiently.

1-4. Comparison Between the Present Embodiment and Comparative Example 2 in Terms of Charging Time Here, an explanation will be given of the ability of the charging system 1 of the present embodiment to reduce a charging time (i.e., a time required from initiation to completion of the charging), by comparing the present embodiment with Comparative Example 2.

As described above, the present embodiment is directed to the charging system 1 configured to perform a battery pack charging using the maximum variation $\Delta I bat$ stored in the battery pack 100. On the other hand, Comparative Example 2 is directed to a charging system (not shown) configured to perform a battery pack charging using a maximum variation stored in a charger.

Figure 6:
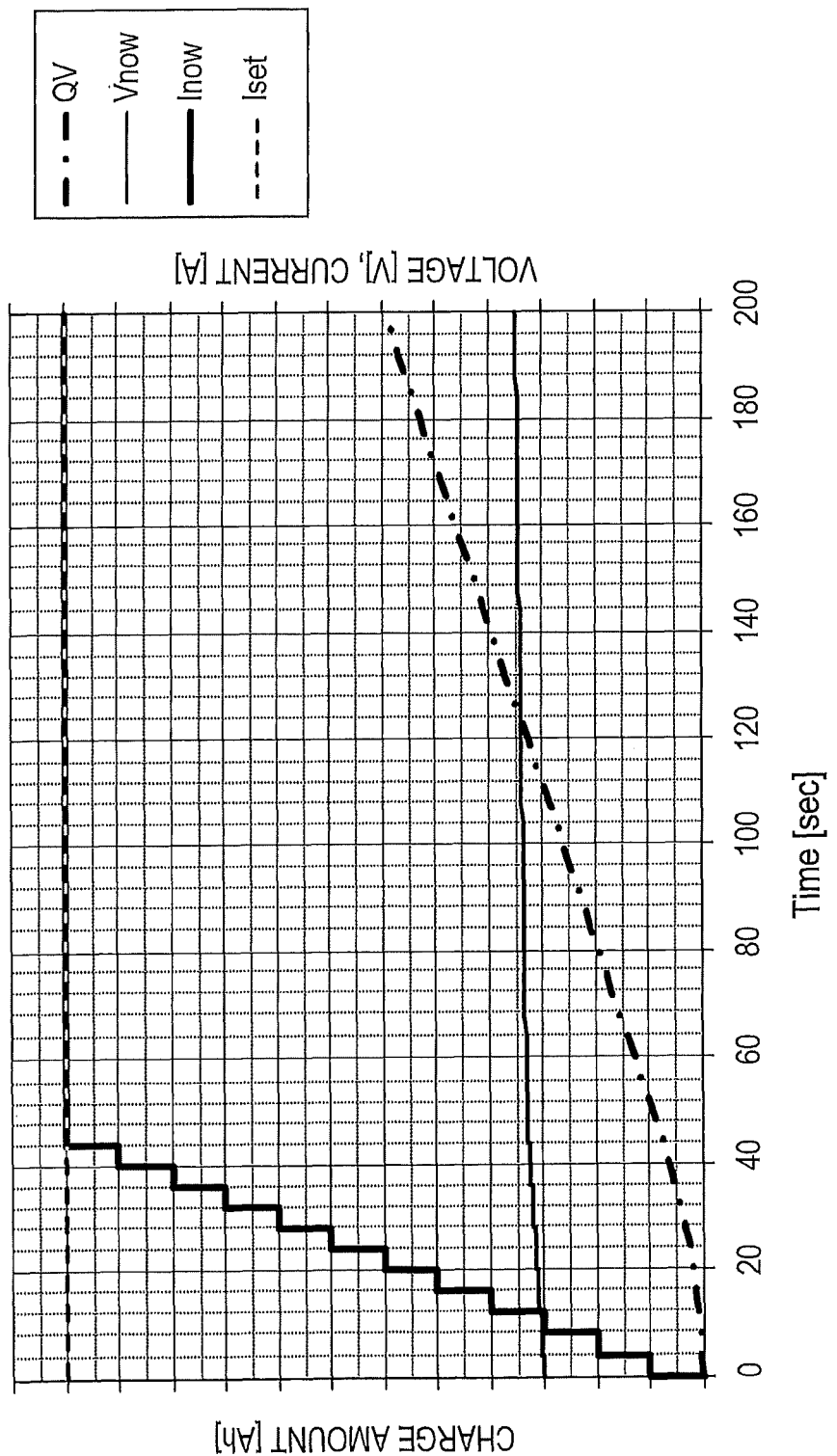
FIG. 6 is a time chart showing profiles of a cell voltage value Vnow, an output current value Inow, and a charge amount QV in the embodiment.

FIG. 6 shows profiles of the cell voltage value Vnow, the output current value Inow, and a charge amount QV when the battery pack 100 performs the charge condition setting process and the charger 600 performs the charge control process in the present embodiment. The charge amount QV indicates a charged power energy [Ah] in the first cell 60a.

Specifically, in the present embodiment, upon initiation of charging at time 0 [sec], the output current value Inow is repeatedly increased by the maximum variation $\Delta I bat$, and this results in the cell voltage value Vnow being repeatedly increased and also the charge amount QV being increased. In approximately 44 [sec], the output current value Inow reaches the reference current value Iset. Thereafter, the charging is continued with the output current value Inow controlled to be about the same value as the reference current value Iset, to thereby further increase the charge amount QV.

Figure 7:
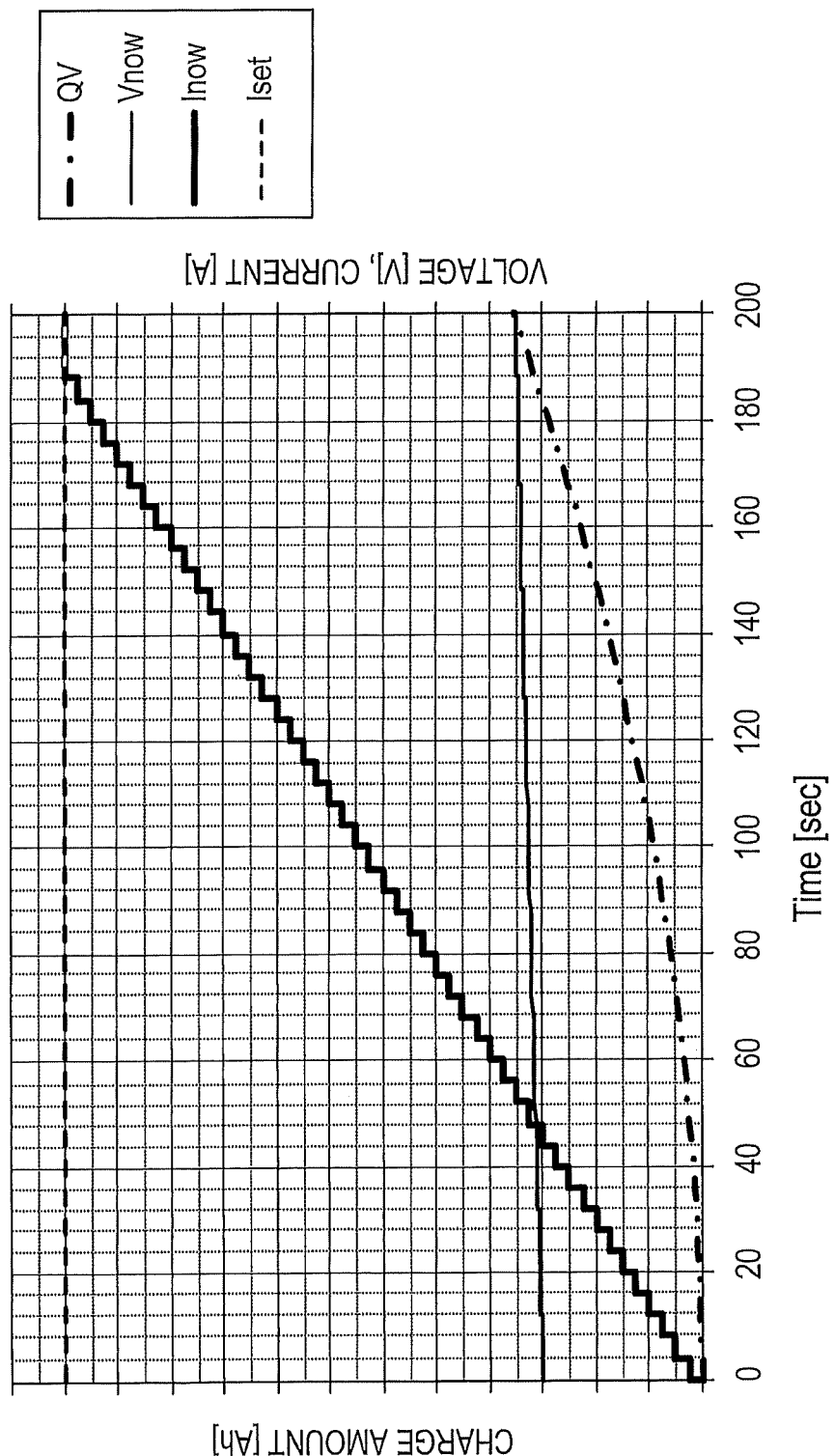
FIG. 7 is a time chart showing profiles of a cell voltage value Vnow, an output current value Inow, and a charge amount QV in Comparative Example 2.

FIG. 7 shows profiles of the cell voltage value Vnow, the output current value Inow, and the charge amount QV when a charge control is performed by a battery pack and the charger of Comparative Example 2.

The charge control process performed by the charger of Comparative Example 2 is different from the charge control process of the present embodiment shown in FIG. 2 in that (i) the process of receiving the target current value Inext from the battery pack 100 is not included, and (ii) the output current Iout is set using the maximum variation $\Delta I2$ stored in the charger as the target current value Inext. The maximum variation $\Delta I2$ in Comparative Example 2 is smaller than the maximum variation $\Delta I bat$ in the present embodiment.

In Comparative Example 2, upon initiation of charging at time 0 [sec], the output current value Inow is repeatedly increased by the maximum variation $\Delta I bat$, and this results in the cell voltage value Vnow being repeatedly increased and also the charge amount QV being increased. However, in Comparative Example 2, the maximum variation $\Delta I bat$ is smaller than that in the present embodiment, and thus, an increase rate of the output current value Inow is smaller. It takes approximately 188 [sec] for the output current value Inow to reach the reference current value Iset.

That is, in the present embodiment, the time required for the output current value Inow to reach the reference current value Iset is shorter than that in Comparative Example 2, and this results in higher increase rate of the charge amount QV. Thus, the charging time of the battery pack 100 can be reduced.

1-5. Effects

As described so far, in the charging system 1, the battery pack 100 calculates the newest value Ine2 using the maximum variation $\Delta I bat$ determined according to the characteristic(s) of the battery pack 100. Thus, the battery pack 100 can control the increase in the target current value Inext within a range according to the characteristic(s) of the battery pack 100. The MPU 620 notifies the charger-side MPU 611 in the charger 600 of the target current value Inext, thereby enabling the battery pack 100 to notify the charger 600 of the target current value Inext according to the characteristic(s) of the battery pack 100.

Thus, the battery pack 100 can inhibit an excessive increase of the charging current supplied from the charger 600 (i.e., the maximum variation $\Delta I bat$). As a result, the variation of the charging voltage caused by the change in the charging current can fall within a range according to the characteristic(s) of the battery pack 100 (specifically, the first cell 60a).

Accordingly, the charging system 1 and the battery pack 100 can inhibit an excessive variation of the charging voltage, thus inhibiting the early stop of charging, damage to the first cell 60a, and so on. The early stop of charging refers to, for example, stop of the charging operation caused by extraordinary increase in the charging voltage before completion of charging of the battery as in the case shown in FIG. 5. The damage to the first cell 60a refers to, for example, damage to the first cell 60a caused by an impermissible charging voltage.

Next, the maximum variation $\Delta I bat$ is determined based on the characteristics of the battery pack 100. The characteristics of the battery pack 100 correspond to the impedance Z of the first cell 60a, and correspond to the arrangement of the first cell 60a and the second cell 60b.

The variation of the charging voltage caused by change in the charging current varies according to, for example, the characteristics of the battery pack 100. Thus, use of the maximum variation $\Delta I bat$ of the present embodiment makes it possible to set the variation of the charging voltage so as to be suited to the characteristics of the first cell 60a, and thus to the characteristics of the battery pack 100. Accordingly, since the variation of the charging voltage can be set according to the characteristics of the first cell 60a, the charging system 1 and the battery pack 100 can inhibit an excessive variation of the charging voltage.

Next, the battery pack 100 is configured to acquire, from the charger 600, the output current value Inow included in the charging operation information of the charger 600. In the battery pack 100, the MPU 620 calculates the newest value Ine2 using the output current value Inow (see S370).

Since the output current value Inow included in the charging operation information is acquired from the charger 600, the battery pack 100 can accurately get the magnitude of the charging current that the charger 600 is outputting to the battery pack 100. Moreover, since the newest value Ine2 is calculated using the output current value Inow as the previous value Ine1, the battery pack 100 can calculate the newest value Ine2 properly even when an error is caused between the previous value Ine1 and an actual magnitude of the charging current.

Accordingly, the battery pack 100 can inhibit an erroneous calculation of the newest value Ine2, thus inhibiting an excessive variation of the charging voltage.

In the battery pack 100, in response to the determination that the cell voltage value Vnow is smaller than the target voltage value CV (negative determination in S350), the MPU 620 calculates the newest value Ine2, which is obtained by adding the maximum variation ΔIbat to the output current value Inow (S370).

This enables the battery pack 100 to calculate the newest value Ine2 so as to increase the charging current while maintaining the cell voltage value Vnow of the first cell 60a within tolerance. Accordingly, the battery pack 100 can increase the charging current within tolerance, thus reducing the charging time.

Figure 3:
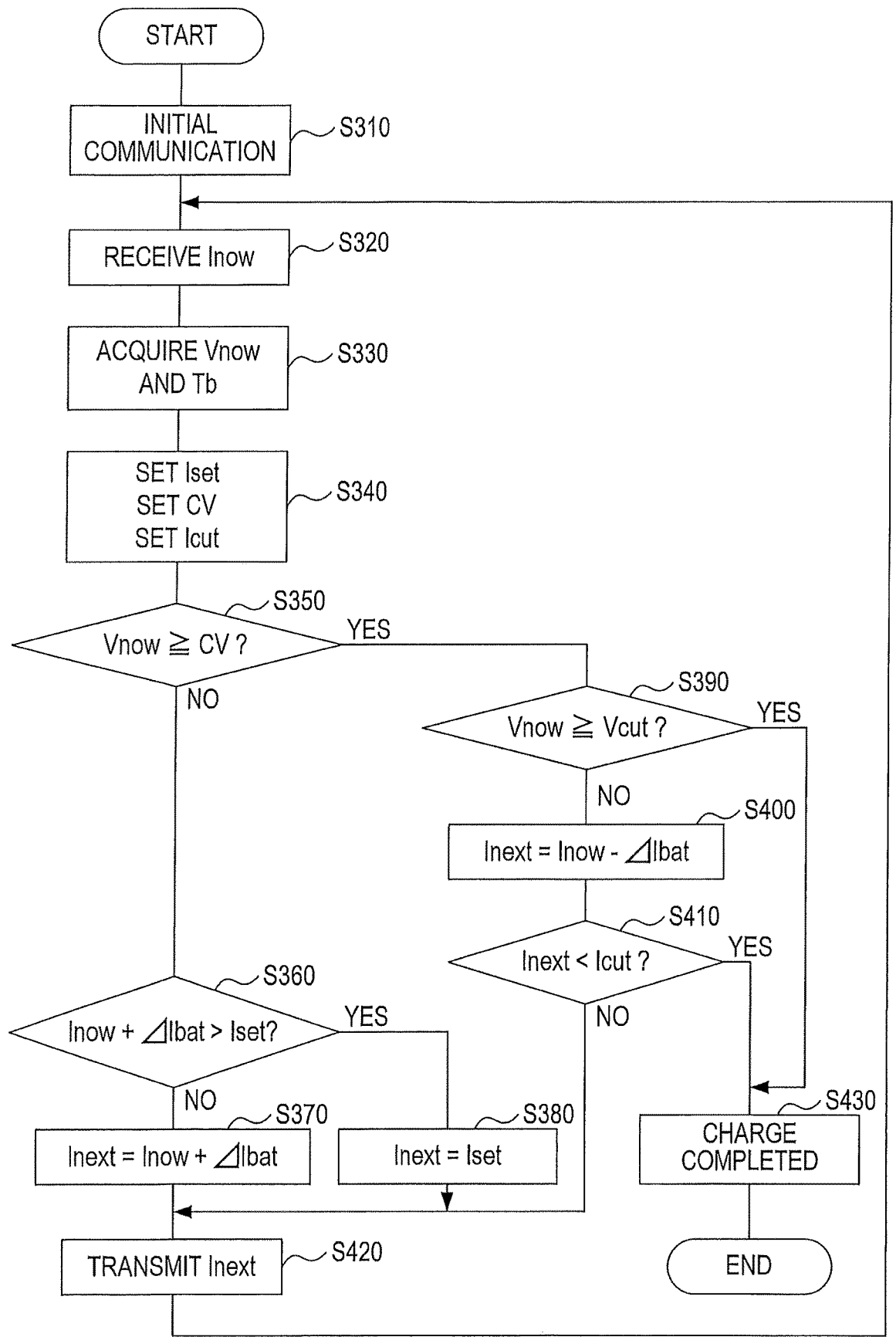
FIG. 3 is a flowchart showing a flow of a charge condition setting process performed by an MPU of the battery pack.

In the present embodiment, the mode has been described in which, after the negative determination in S350, the process proceeds to S370 via S360 as shown in the flowchart of FIG. 3. However, the present disclosure is not limited to this mode and, for example, the process may proceed directly to S370, not via S360. In the case of omitting S360, S380 may also be omitted.

In the battery pack 100, in response to the determination that the cell voltage value Vnow is larger than or equal to the target voltage value CV (affirmative determination in S350), the MPU 620 calculates the newest value Ine2 by subtracting the maximum variation ΔIbat from the output current value Inow (S400).

This enables the battery pack 100 to calculate the newest value Ine2 while inhibiting the cell voltage value Vnow of the first cell 60a beyond tolerance, by reducing the target current value Inext when the cell voltage value Vnow is larger than or equal to the target voltage value CV. Accordingly, use of the battery pack 100 enables continued proper charging operation while inhibiting occurrence of charging stop caused by the impermissible charging voltage.

In the battery pack 100, in response to the determination that the provisional current value Ite is smaller than or equal to the reference current value Iset (negative determination in S360), the MPU 620 calculates the newest value Ine2, which is obtained by adding the maximum variation ΔIbat to the output current value Inow (S370). On the other hand, in response to the determination that the provisional current value Ite is larger than the reference current value Iset (affirmative determination in S360), the MPU 620 sets the reference current value Iset as the newest value Ine2 (S380).

This enables the battery pack 100 to calculate the newest value Ine2 so as to increase the charging current while maintaining the magnitude of the charging current within tolerance. Accordingly, the battery pack 100 can increase the charging current within tolerance, thus reducing the charging time.

Furthermore, the battery pack 100 can calculate the newest value Ine2 while inhibiting the magnitude of the charging current beyond tolerance. Accordingly, use of the battery pack 100 enables continued proper charging operation while inhibiting occurrence of charging stop caused by an impermissible magnitude of the charging current.

In the charging system 1, the battery pack 100 notifies the charger 600 of the target current value Inext as the charge condition information. The charger 600 supplies the battery pack 100 with the charging current of the magnitude set based on the target current value Inext. Accordingly, the charging system 1 can inhibit an excessive variation of the charging voltage, thus inhibiting the early stop of charging, damage to the battery, and so on.

In the charger 600 of the charging system 1, in response to the determination that the target current value Inext is smaller than or equal to the upper limit current value Ic1 (negative determination in S170), the charger-side MPU 611 sets the target current value Inext as the output current Iout (S180). On the other hand, in response to the determination that the target current value Inext is larger than the upper limit current value Ic1 (affirmative determination in S170), the charger-side MPU 611 sets the upper limit current value Ic1 as the output current Iout (S190).

This enables the charging system 1 to inhibit damage to the charger 600 caused by an excessive temperature rise during charging of the battery pack 100 by the charger 600.

1-6. Correspondence Between Terms

The MPU 620 performing the processes in S370, S380, and S400 corresponds to one example of a target current calculator of the present disclosure. The MPU 620 and the communicator 400 performing the process in S420 correspond to one example of an information notifier of the present disclosure. The MPU 620 and the communicator 400 performing the process in S330 correspond to one example of an operation information acquirer of the present disclosure. The MPU 620 performing the process in S350 corresponds to one example of a voltage comparator of the present disclosure. The MPU 620 performing the process in S360 corresponds to one example of a charging current comparator of the present disclosure.

The charger-side power-supply circuit 613 corresponds to one example of a current outputter of the present disclosure. The charger-side MPU 611 performing the process in S160 corresponds to one example of a condition information acquirer of the present disclosure. The charger-side MPU 611 performing the process in S180 or S190 corresponds to one example of an output current setter of the present disclosure. The charger-side MPU 611 performing the process in S170 corresponds to one example of an output current comparator of the present disclosure.

2. Other Embodiments

The embodiment of the present disclosure has been described in the above; however, the present disclosure is not limited to the above-described embodiment and can be carried out in various modes within the scope not departing from the spirit of the present disclosure.

(2a) In the above-described embodiment, a specific magnitude of the maximum variation ΔIbat is not explicitly described. However, the maximum variation ΔIbat is set to any given value determined based on the characteristic(s) of the battery pack 100 (e.g., the impedance of the first cell 60a, the arrangement of the first cell 60a and the second cell 60b, and so on). Alternatively, it is one option to measure a variation of the charging voltage caused by change in the charging current using the actual battery pack 100, thus setting the maximum variation ΔIbat based on the measurement result.

(2b) In the above-described embodiment, the configuration has been described in which the battery pack 100 acquires the output current value how from the charger 600 (S320). However, the present disclosure is not limited to such a configuration. For example, in the charge condition setting process performed by the MPU 620 of the battery pack 100, the target current value Inext calculated last time may be used as the output current value Inow to calculate the newest value Ine2.

(2c) In the above-described embodiment, the mode has been described in which the serial communication is employed between the battery pack 100 (the communicator 400) and the charger 600. However, the present disclosure is not limited to the serial communication, and other types of communication, such as parallel communication and multiplex communication, may be employed. Further, in the above-described embodiment, the mode has been described in which the two-way communication is employed between the battery pack 100 (the communicator 400) and the charger 600. However, one-way communication may be employed. In this case, two or more communication paths for the one-way communication may be provided.

(2d) A function performed by a single element in the above-described embodiments may be performed by two or more elements, and a function performed by two or more elements may be performed by a single element. At least part of a configuration in the above-described embodiments may be replaced by a known configuration having a similar function. Part of a configuration in the above-described embodiments may be omitted. At least part of a configuration in the above-described embodiments may be added to or replace another configuration in the above-described embodiments. Any and all modes encompassed by the technical ideas specified only by the recitations in the appended claims are embodiments of the present disclosure.

What is claimed is:

1. A charging system, comprising:
   a battery pack including:
      a battery configured to be charged with a charging current supplied from a charger, the battery including cells;
      a memory device configured to store a maximum variation $\Delta$Ibat of a charging current value Inow, the charging current value Inow corresponding to a magnitude of the charging current, the maximum variation $\Delta$Ibat being determined depending on (i) a magnitude of an impedance of each of the cells and (ii) a configuration of the battery; and
      a Micro Processing Unit (MPU) configured to perform a charge condition setting process, the charge condition setting process including:
         acquiring charging operation information from the charger, the charging operation information relating to an operation required for the charger to charge the battery, the charging operation information including the charging current value Inow,
         determining whether a cell voltage value Vnow is larger than or equal to a target voltage value CV, the cell voltage value Vnow corresponding to a magnitude of a voltage of each of the cells, and the target voltage value CV corresponding to the magnitude of the voltage of each of the cells required for the charger to charge the battery,
         determining whether a provisional current value (Inow+$\Delta$Ibat) is larger than a reference current value Iset, the provisional current value (Inow+$\Delta$Ibat) corresponding to a sum of (i) the charging current value Inow included in the charging operation information and (ii) the maximum variation $\Delta$Ibat, the reference current value Iset corresponding to an upper limit of the charging current value Inow permissible in the battery,
         calculating a target current value Inext by adding the maximum variation $\Delta$Ibat to the charging current value Inow included in the charging operation information, in response to (i) the cell voltage value Vnow being determined to be smaller than the target voltage value CV and (ii) the provisional current value (Inow+$\Delta$Ibat) being determined to be smaller than or equal to the reference current value Iset, the target current value Inext corresponding to the magnitude of the charging current required to charge the battery,
         setting the reference current value Iset as the target current value Inext in response to (i) the cell voltage value Vnow being determined to be smaller than the target voltage value CV and (ii) the provisional current value (Inow+$\Delta$Ibat) being determined to be larger than the reference current value Iset,
         calculating the target current value Inext by subtracting the maximum variation $\Delta$Ibat from the charging current value Inow included in the charging operation information, in response to the cell voltage value Vnow being determined to be larger than or equal to the target voltage value CV, and
         transmitting, to the charger, charge condition information including the target current value Inext; and
   the charger including:
      a charger-side power-supply circuit configured to supply the charging current to the battery pack; and
      a charger-side Micro Processing Unit (MPU) configured to perform a charge control process, the charge control process including:
         acquiring the charge condition information from the battery pack,
         determining whether the target current value Inext included in the charge condition information is larger than an upper limit current value Ic1, the upper limit current value Ic1 corresponding to an upper limit of the charging current value Inow determined according to a temperature of the charger,
         setting the target current value Inext included in the charge condition information as the magnitude of the charging current, in response to the target current value Inext included in the charge condition information being determined to be smaller than or equal to the upper limit current value Ic1, and
         setting the upper limit current value Ic1 as the magnitude of the charging current, in response to the target current value Inext included in the charge condition information being determined to be larger than the upper limit current value Ic1.

2. A battery pack, comprising:
   a first cell configured to be charged with a charging current supplied from a charger;
   a memory device configured to store a maximum variation of a charging current value, the charging current value indicating a magnitude of the charging current output from the charger to the battery pack, the maximum variation being determined depending on a characteristic of the battery pack;
   a target current calculator configured to calculate a newest value of a target current value based on (i) a previous value of the target current value and (ii) the maximum variation, the target current value corresponding to the magnitude of the charging current required to charge the first cell;
an information notifier configured to transmit charge condition information to the charger, the charge condition information including the newest value; and
an operation information acquirer configured to acquire charging operation information from the charger via communication with the charger, the charging operation information including the charging current value.

3. The battery pack according to claim 2,
wherein the characteristic of the battery pack includes at least a magnitude of an impedance of the first cell.

4. The battery pack according to claim 2, further comprising:
a second cell configured to be charged with the charging current.

5. The battery pack according to claim 4,
wherein the first cell is connected in parallel with the second cell.

6. The battery pack according to claim 4,
wherein the characteristic of the battery pack depends on at least an arrangement of the first cell and the second cell.

7. The battery pack according to claim 2,
wherein the target current calculator is configured to set the charging current value included in the charging operation information as the previous value in order to calculate the newest value.

8. The battery pack according to claim 2, further comprising:
a voltage comparator configured to determine whether a cell voltage value is smaller than a target voltage value, the cell voltage value corresponding to a magnitude of a voltage of the first cell, and the target voltage value corresponding to the magnitude of the voltage of the first cell required for the charger to charge the first cell,
wherein the target current calculator is configured to calculate the newest value by adding the maximum variation to the previous value, in response to the voltage comparator determining that the cell voltage value is smaller than the target voltage value.

9. The battery pack according to claim 8,
wherein the target current calculator is configured to calculate the newest value by subtracting the maximum variation from the previous value, in response to the voltage comparator determining that the cell voltage value is larger than or equal to the target voltage value.

10. A battery pack, comprising:
a first cell configured to be charged with a charging current supplied from a charger;
a memory device configured to store a maximum variation of a charging current value, the charging current value corresponding to a magnitude of the charging current, the maximum variation being determined depending on a characteristic of the battery pack;
a target current calculator configured to calculate a newest value of a target current value based on (i) a previous value of the target current value and (ii) the maximum variation, the target current value corresponding to the magnitude of the charging current required to charge the first cell;
an information notifier configured to transmit charge condition information to the charger, the charge condition information including the newest value; and
a charging current comparator configured to determine whether a provisional current value is smaller than or equal to a reference current value, the provisional current value corresponding to a sum of the previous value and the maximum variation, the reference current value corresponding to an upper limit of the charging current value permissible in the first cell,
wherein the target current calculator is configured to calculate the newest value by adding the maximum variation to the previous value, in response to the charging current comparator determining that the provisional current value is smaller than or equal to the reference current value, and
wherein the target current calculator is configured to set the reference current value as the newest value, in response to the charging current comparator determining that the provisional current value is larger than the reference current value.

11. A charger, comprising:
a current outputter configured to supply the charging current to a battery pack, the battery pack including:
a first cell configured to be charged with a charging current supplied from a charger;
a memory device configured to store a maximum variation of a charging current value, the charging current value indicating a magnitude of the charging current output from the charger to the battery pack, the maximum variation being determined depending on a characteristic of the battery pack;
a target current calculator configured to calculate a newest value of a target current value based on (i) a previous value of the target current value and (ii) the maximum variation, the target current value corresponding to the magnitude of the charging current required to charge the first cell;
an information notifier configured to transmit charge condition information, the charge condition information including the newest value; and
an operation information acquirer configured to acquire charging operation information from the charger via communication with the charger, the charging operation information including the charging current value;
a condition information acquirer configured to acquire the charge condition information from the battery pack;
an output current setter configured to set the magnitude of the charging current based on the newest value included in the charge condition information; and
a charger-side communicator configured to output the charging operation information to the battery pack, the charging operation information including the charging current value.

12. The charger according to claim 11, further comprising:
an output current comparator configured to determine whether the newest value is smaller than or equal to an upper limit current value, the upper limit current value corresponding to an upper limit of the charging current value determined according to a temperature of the charger,
wherein the output current setter is configured to set the newest value as a value corresponding to the magnitude of the charging current, in response to the output current comparator determining that the newest value is smaller than or equal to the upper limit current value, and
wherein the output current setter is configured to set the upper limit current value as a value corresponding to the magnitude of the charging current, in response to the output current comparator determining that the newest value is larger than the upper limit current value.

13. A method for controlling charging of a battery pack, the method comprising:
- detachably connecting the battery pack to a charger, the battery pack being configured to receive a charging current from the charger connected thereto;
- calculating a newest value of a target current value based on (i) a previous value of the target current value and (ii) a maximum variation, the target current value corresponding to a magnitude of the charging current required to charge a cell in the battery pack, the maximum variation corresponding to a characteristic of the battery pack;
- notifying the charger of charge condition information including the newest value;
- acquiring charging operation information from the charger via communication with the charger, the charging operation information including a charging current value, the charging current value indicating a magnitude of the charging current output from the charger to the battery pack; and
- detaching the battery pack from the charger.

14. The battery pack according to claim 2, wherein the operation information acquirer is configured to perform a half-duplex communication, a serial communication, a parallel communication, or a multiplex communication with the charger to thereby acquire the charging operation information from the charger.

15. The charger according to claim 11, wherein the charger-side communicator is configured to perform a half-duplex communication, a serial communication, a parallel communication, or a multiplex communication with the battery pack to thereby output the charging operation information to the battery pack.

16. The battery pack according to claim 2, further comprising:
- a terminal configured (i) to be detachably connected to the charger and (ii) to receive the charging current from the charger connected.

* * * * *